Oct. 21, 1969   H. E. GUSTAFSON ET AL   3,473,779
FLEXIBLE TUBE VALVE HAVING POSITIVE OPENING AND CLOSING MEANS
Filed April 12, 1965                           2 Sheets-Sheet 1

INVENTORS
HENRY E. GUSTAFSON
HAROLD L. JOHNSON
BY
*William P. Sewald*
ATTORNEY

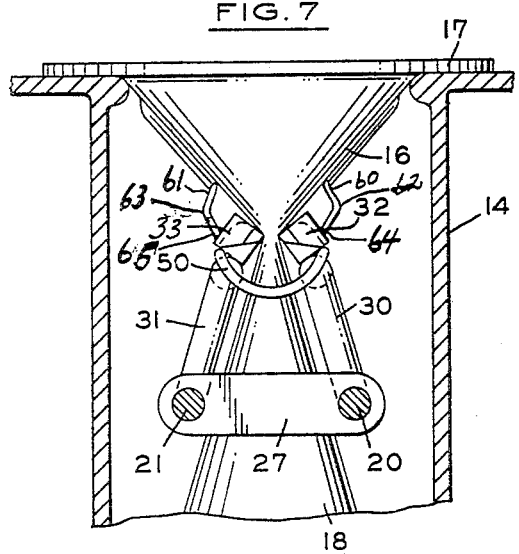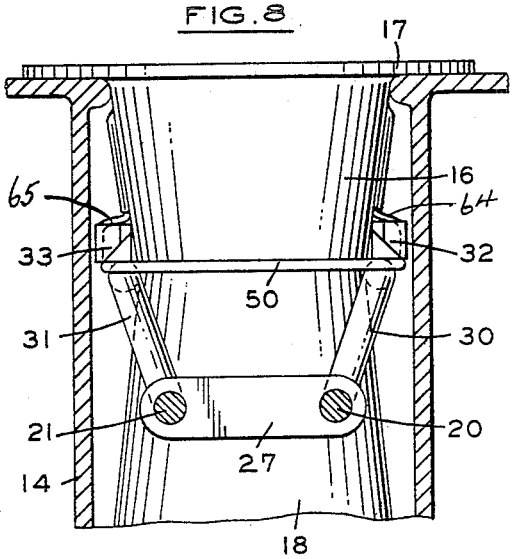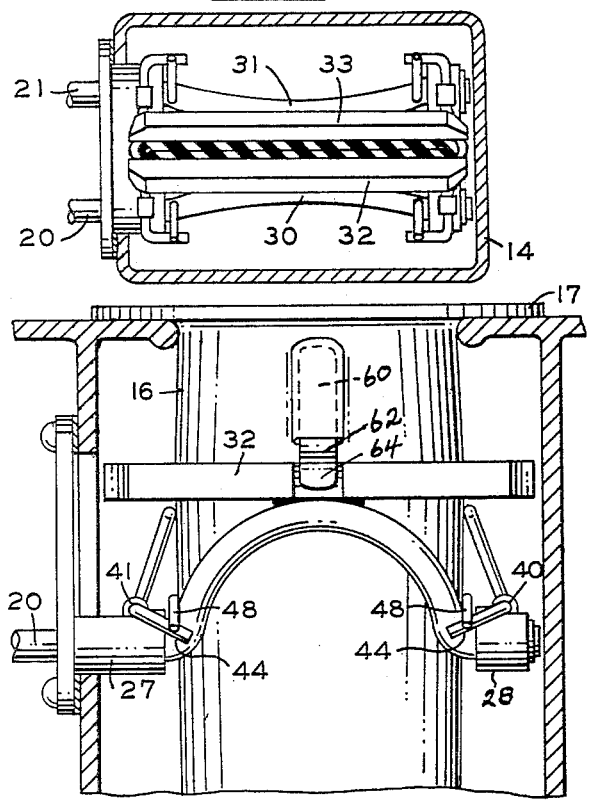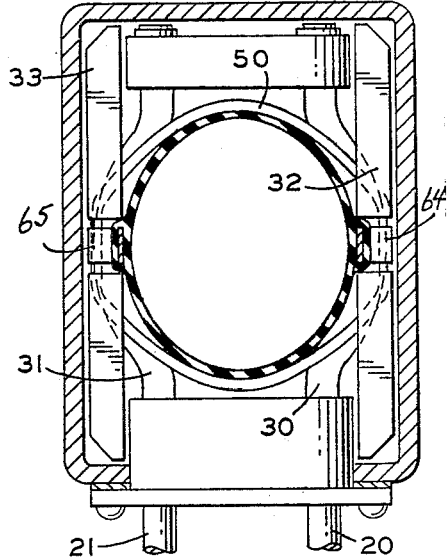

United States Patent Office 3,473,779
Patented Oct. 21, 1969

3,473,779
FLEXIBLE TUBE VALVE HAVING POSITIVE
OPENING AND CLOSING MEANS
Henry E. Gustafson, 327 E. 13 Mile Road, and Harold L.
Johnson, 323 E. 13 Mile Road, both of Royal Oak,
Mich. 48067
Filed Apr. 12, 1965, Ser. No. 447,222
Int. Cl. F16l 55/14; F16k 31/52; A47k 11/02
U.S. Cl. 251—9                                    1 Claim

ABSTRACT OF THE DISCLOSURE

A flexible tube valve having oppositely rotating shafts, a lever for quickly turning the shafts, cranks on each shaft which swing into and close the tube at one point in one turning direction from a cylindrical condition to a flat condition with reverse curves at the ends and which swing away from the tube in the opposite turning direction to allow the tube to open, and tube opening means actuated by the cranks in moving away from the tube operative to urge the tube to an open cylindrical condition by forcing the reverse curves of the ends radially inwardly.

---

This invention relates to a positively closing and positively opening flexible tube drain valve such as for toilets particularly suitable for use on vehicles where water supply and disposal facilities are limited.

Various vehicles such as trains, trucks, busses, airplanes, trailers, and boats require toilet facilities for passengers. These facilities must be light in weight and they are limited in water supply and disposal capacity. The valve of the invention is light in weight and requires very little water to float and flush waste materials as it is devoid of traps, crevasses, and lost space such as occasioned in clapper type valves and trap type valves.

While flexible tube or sleeve valves are known to the prior art, they provide only means for pinching the valve closed. In the prior art devices, the tube is molded or formed open and must move resiliently without positive aid from a closed to an open position. The normal position of the closure means is to close off the resilient sleeve or tube. The resiliency of the sleeve or tube fails after a period of time to provide sufficient rebound characteristics to move to the full open position upon the release of the closure means. Thus after a period of time, the elastic tube or sleeve loses its resilience and tends to remain in the closed or sealed position after the closure means are retracted to the open position.

With the foregoing in view the primary object of the invention is to provide an elastic tube or sleeve valve with closure means for normally holding the tube in the pinched off or closed position.

An object of the invention is to provide positive opening means for urging the valve tube from its pinched off closed position to an open position upon the closure means moving to the retracted open position.

An object of the invention is to provide positively actuating opening means for the valve tube so that the tube may be formed or molded with the shape of the open position or the closed position as desired.

An object of the invention is to provide positively actuating linkage urged into opening relationship against the resilient tube or sleeve so as to force the sleeve to an open position upon the closure means moving to its retracted open position.

An object of the invention is to provide a band surrounding the resilient tube or sleeve which permits the closure means to pinch the resilient tube closed to a sealed off position and which, upon retraction of the closure means, positively contacts the tube urging it to the open position from its pinched closed position.

An object of the invention is to provide connecting means on the tube side wall in engagement with the closure means such as on the side wall of the tube between the reversely curved tube wall portions when the tube is pinched closed, so that when the closure means are retracted, the connecting means move outwardly with the closure means pulling the side walls of the tube radially outwardly to an open position.

An object of the invention is to provide a positively closing and positively opening resilient tube or sleeve valve which is simple in design and construction, inexpensive to manufacture, easy to install, and which is operative to not only pinch the sleeve or tube closed but also operative to positively urge the sleeve from its closed condition to its open position.

These and other objects of the invention will become apparent by reference to the following description of a resilient sleeve or tube valve and actuating means therefore embodying the invention taken in connection with the accompanying drawings in which:

FIG. 5 is a cross-sectional view of the device as seen in FIG. 3 taken from the side of FIG. 3 and additionally showing connecting means between the tube and the closure means.

FIG. 6 is a reduced cross-sectional view of FIG. 2 showing the pinched-off sealing condition of the tube.

FIG. 7 is a view similar to FIG. 2 showing a second embodiment with the valve closed and showing a band in an untensioned condition and also showing connecting means between the tube and closure means.

Figure 1:
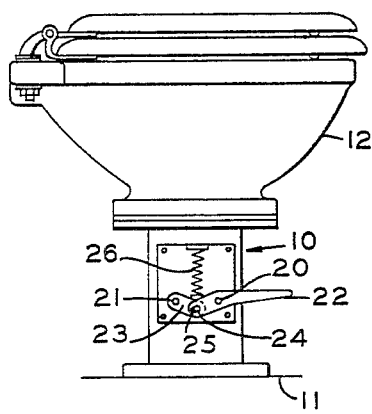
FIG. 1 is a side elevational view of the novel valve disposed below a toilet bowl.

FIG. 8 is a view similar to FIG. 7 showing the valve in the open position with the band tensioned urging the sleeve to the open position and with the connecting means holding the tube open; and FIG. 9 is a cross-sectional view of FIG. 8 showing the band exerting pressure on the tube sleeve at points normal to the points on the sleeve at which pinching closing force is exerted and showing the connecting means.

Referring now to the drawings wherein like numerals refer to like and corresponding parts throughout the several views, the resilient sleeve or tube valve disclosed therein to illustrate the invention comprises a conduit, valve, and support assembly 10 resting on a base 11 and supporting a toilet 12. The assembly 10 includes an outer cover panel 14, an inner frame 15, and a resilient tube 16. The tube 16 has a top flange 17 for sealing against the toilet 12 at its upper inlet end. The lower outlet end 18 of the tube 16 leads to a drain or sanitary disposition. Closure means on the frame 15 and cover panel 14 move between the tube 16 pinched closed condition of FIG. 2 and the tube 16 open condition of FIGS. 3, 4, and 5. The tube may be formed with a shape either normally in the closed position or normally in the open position.

When the tube is normally molded in the closed position, it naturally conforms to the normal closed condition of the valve and thus is not deformed in the normal closed condition. This makes a better seal and insures longer trouble free life for the valve.

More particularly, a pair of shafts 20 and 21 are pivotally mounted on the frame 15 and panel 14. The outer ends of the shafts 20 and 21 are respectively equipped with a foot pedal 22 and an arm 23. The pedal 22 and the arm 23 have adjacent overlapped ends. The adjacent end of the pedal 22 has a slot 24. The adjacent end of the arm 23 has a pin 25 lying in the slot 24. A spring 26 bears downwardly on the pin 25 displaceably urging the pedal 22 and arm 23 to the position indicated in FIG. 1 to angularly position the shafts 20 and 21 as seen in FIG. 2.

The shafts 20 and 21 are bearinged in a frame cross member 27 on one side of the tube 16 and in a frame cross member 28 on the other side of the tube 16. Intermediate the cross members 27 and 28, the shafts are equipped with cranks 30 and 31 respectively. Pinch bars 32 and 33 are welded to the cranks 30 and 31 respectively.

Normally the spring 26 urges the pedal 22 and arm downwardly at the pin 25 angularly moving the shafts 20 and 21 in opposite directions forcing the cranks 30 and 31 inwardly against the tube 16 with the pinch bars 32 and 33 forcing the tube when molded in a normally open position to a closed planar sealed condition at the bars from its open cylindrical condition, and urging the tube when molded in a normally closed position to a sealed condition.

Figure 4:
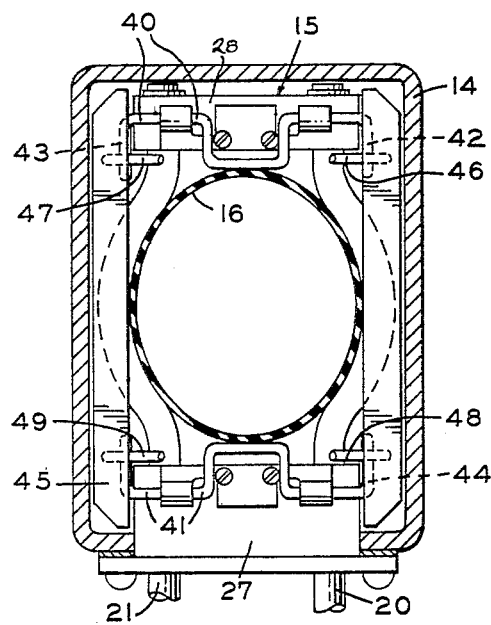
FIG. 4 is a cross-sectional view of the device as seen in FIG. 3.
Figure 3:
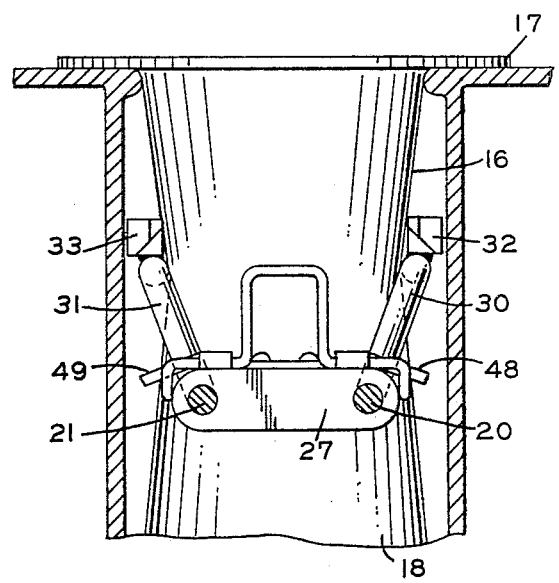
FIG. 3 is a view similar to FIG. 2 showing the valve in the open position.

To open the tube, a user steps on the pedal 22 which directly angularly moves the shaft 20, crank 30, and pinch bar 32 away from the tube 16 allowing or forcing the tube 16 to expand from its pinched planar condition to its cylindrical condition on their side of the frame 15. The movement of the pedal is communicated simultaneously to the arm 23 by the pedal slot 24 and arm pin 25 to angularly move the shaft 21, crank 31, and pinch bar 33 away from the tube 16 allowing or forcing the tube 16 to expand from its pinched planar condition to its cylindrical condition on their side of the frame 15. This condition is seen in FIGS. 3–5.

The upward movement of the pin 25 compresses the spring 26. Upon the user releasing the pedal 22, the spring drives the pin 25 downwardly reversely moving the pedal 22 and arm 23 and reversely angularly moving the shafts 20 and 21, cranks 30 and 31, and pinch bars 32 and 33 against the tube 16 forcing or urging the tube 16 to its pinched closed planar condition as seen in FIGS. 1 and 2.

However when the tube is molded in the open position the tube through loss of resilience may not open when the pinch bars 32 and 33 are retracted as the normal valve condition of the tube 16 is pinched closed. To insure that the tube 16 will open when the pinch bars 32 and 33 are retracted, positive acting tube opening means are provided. Also to open the tube when the tube is molded in the closed shape, positive acting tube opening means are provided. These means are now described.

A second pair of crank arms 40 and 41 are pivotally mounted on the frame 15 lying normal to the axis of the shafts 20 and 21. The crank arm 40 has levers 42 and 43 and the crank arm 41 has levers 44 and 45. The shaft 20 has bosses 46 and 48 for contacting the crank arm levers 42 and 44 respectively. The shaft 21 has bosses 47 and 49 for contacting the crank arm levers 43 and 45 respectively. The crank arms, levers, and bosses are coordinated for the following described operation and action.

Figure 2:
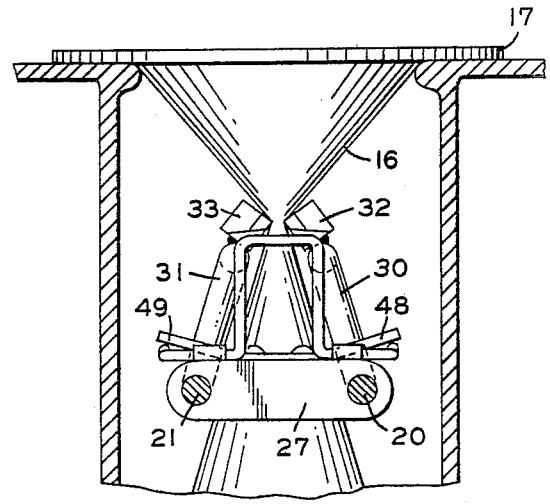
FIG. 2 is an enlarged vertical cross-sectional view of the valve portion of FIG. 1 with the bottom partly broken away showing the valve in the pinched closed condition.

When the shafts 20 and 21 are in the angular position of FIGS. 1 and 2, the bosses 46–49 angle upwardly allowing the lever arms 42–45 to rise allowing the crank portions of the crank arms 40 and 41 to move and locate radially away from the pinched or closed reversely folded portion of the tube 16.

When the shafts 20 and 21 are in the angular position of FIG. 3–5, the bosses 46–49 angle downwardly pushing the lever arms 42–45 downwardly and throwing the crank portions of the crank arms 40 and 41 radially toward and against the pinched reversely folded portions of the tube 16. In the movement of the crank arms 40 and 41 from the position of FIGS. 1 and 2 to that of FIGS. 3–5, they urge the reversely folded pinched portions of the tube 16 radially inwardly thereby positively urging the tube 16 to an unpinched cylindrical condition.

As the tube positive opening means are coordinated with the tube opening and closing pinch means, the action of the positive tube opening means occurs automatically with the pinching and unpinching of the valve tube 16.

The embodiment of the positive opening means of FIGS. 7–9 is now described. In this embodiment, a band 50 surrounds the tube 16 and lies under the pinch bars 32 and 33 and above the cranks 30 and 31 on the shafts 20 and 21 respectively. Thus the points of attachment between the cranks 30 and 31 and the pinch bars 32 and 33 lies on the inside of the band 50 while the band 50 itself, lies on the outside of the tube 16. This positions and locates the band 50. The band 50 is relatively rope-like in character and may be a cord, a cable, a rubber O-ring, a strap, or other suitable items. The band 50 is therefore relatively flexible but relatively unstretchable.

In operation, when the valve device of FIGS. 7–9 is closed with the cranks 30–31 and pinch bars 32–33 located radially inwardly of the tube 16, the band 50 is untensioned and lies relaxed in loose surrounding relationship to the tube 16 at its pinched-closed planar location, FIG. 7. When the valve device is actuated from the closed position of FIG. 7 to the open position of FIGS. 8 and 9, the cranks 30–31 and pinch bars 32–33 move radially outwardly of the tube 16 permitting it to open to a cylindrical condition.

With the cranks 30–31 and pinch bars 32–33 located radially outwardly of the tube 16, FIGS. 8 and 9, the band 50 is tensioned between the points of attachment at the cranks and bars which causes the band 50 to move radially inwardly intermediate the points of attachment and engage the tube 16 at the reversely folded places of the tube 16 urging the tube 16 radially inwardly thereat thereby positively urging the tube to an open cylindrical shape.

In other words, in the closed condition of the valve device, the band 50 is allowed to assume a relaxed elliptical shape loosely surrounding the tube 16 planar pinched closed location. In the open condition of the valve device, the band 50 is urged to a tensioned elliptical shape normal to its relaxed elliptical shape. In its tensioned elliptical shape, the band is forced radially inwardly against the reversely folded portions of the tube in its closed planar condition urging them radially inwardly thereby positively forcing the tube 16 to move from its planar condition to an open cylindrical condition.

Referring now to the inter-connecting means between the tube 16 and the cranks 30–31 and pinch bars 32–33 respectively, FIGS. 5, 7, 8, and 9, for pulling the tube radially outwardly when the valve is opened, a pair of metal plates 60–61 are molded in, bonded to, or otherwise attached to the side wall of the tube 16 at 180 degrees to each other. The plates 60–61 have off-set portions 62–63 respectively leading over the pinch bars 32 and 33 respectively. The off-set portions 62–63 respectively terminate in fingers 64–65. The fingers 64–65 are in sliding engagement with the pinch bars 32 and 33 respectively. FIG. 7 shows the finger 64–65 with the valve in the closed condition. FIGS. 5, 8, and 9 show the fingers 64–65 with the valve in the open condition. While the plates are shown above the pinch bars with the fingers extending downwardly, the plates may be attached to the tube below the pinch bars with the fingers extending upwardly. As hereinbefore stated, the tube may be molded with either a closed or open shape.

In operation with the tube in the closed sealed condition, the fingers move with the pinch bars and permit the tube to be forced to or urged in the sealed closed position, FIG. 7. When the valve is actuated to open, the pinch bars 32–33 move radially outwardly from the tube 16 in engagement with the fingers 64–65 moving with the pinch bars 32–33 respectively pulling the tube 16 from the closed position to the open position, FIGS. 5, 7, and 9, with positive action.

Thus it can be seen that the various embodiments of the invention provide a tube valve device which is positively urged open thereby insuring operation of the valve in both the closed and open conditions. It will be understood that the various embodiments of the invention may be used singly or in combinations as desired.

What is claimed is:
1. A quick acting sleeve valve combination positionable in a drain such as between a toilet and sanitary disposition means which is quickly positively pinched in a closed sealing position and quickly positively urged to an open channeling position, comprising:
 a flexible tube when open having a substantially cylindrical side wall defining an internal channel and when closed having a substantially planar portion closing the internal channel;
 said tube having opposite inlet and outlet ends;
 means on said tube for connecting said inlet end of said tube to a fixture such as a toilet; said outlet end of said tube when so connected leading to a drain such as to sanitary disposition means;
 a frame lying radially outside said tube intermediate its ends;
 a first shaft rotatably supported on said frame;
 a second shaft rotatably supported on said frame;
 said shafts when so disposed lying parallel to one another on opposite sides of said tube intermediate the ends of said tube;
 means rotationally interconnecting said shafts so that said shafts turn in opposite angular directions;
 a crank on each said shaft in the location of said tube;
 an actuating lever connected to one said shaft for turning said one shaft in one angular direction whereby said other shaft turns in the opposite angular direction through said interconnecting means;
 said lever and said means for turning said shafts angularly in opposite directions being operable to swing said cranks inwardly toward one another against said tube side wall on opposite sides thereof to compress said tube between said cranks in an internally closed planar condition longer than its diameter with said tube having reversely folded portions extending beyond the normal radial location of said tube;
 said lever and said means for turning said cranks angularly in opposite directions being operable to swing said cranks outwardly away from one another and away from said tube to release said tube from its compressed planar condition to allow said tube to open internally to an open cylindrical shape;
 tube opening means at said tube and engaging said cranks at opposite points;
 said tube opening means comprising a pair of fingers attached to said tube and oppositely located on said tube relative to one another and engaging said cranks;
 said fingers moving with said cranks and tube in the inward movement of said cranks to permit said cranks to press against said tube to pinch said tube to effect a sealing condition;
 said fingers moving with said cranks in the outward movement of said cranks to pull the tube side wall at the attachment between said tube and fingers radially outwardly from a sealed substantially planar condition to an internally open substantially cylindrical condition;
 said tube opening means including additional means engaging said cranks at opposite points;
 said additional means, upon said cranks swinging away from one another to the open position, being actuated by said crank by contact therebetween moving said additional means to a position positively urging said tube from its closed planar condition to an internally open cylindrical condition.

References Cited

UNITED STATES PATENTS

| 2,703,100 | 3/1955 | Perkins | 251—9 XR |
| 143,907 | 10/1873 | Hyde | 251—7 |
| 2,890,855 | 6/1959 | Little | 251—9 XR |

FOREIGN PATENTS

| 268,933 | 9/1950 | Switzerland. |
| 1,038,850 | 9/1958 | Germany. |

WILLIAM F. O'DEA, Primary Examiner
RICHARD GERARD, Assistant Examiner

U.S. Cl. X.R.
4—142; 251—295